US010513598B2

(12) United States Patent
Ni et al.

(10) Patent No.: US 10,513,598 B2
(45) Date of Patent: Dec. 24, 2019

(54) FLAME RETARDANT COMPOSITION AND FLAME-RETARDANT SYNTHETIC RESIN COMPOSITION

(71) Applicant: ADEKA CORPORATION, Tokyo (JP)

(72) Inventors: Yang Ni, Saitama (JP); Yutaka Yonezawa, Saitama (JP); Kei Asai, Saitama (JP); Tetsuo Kamimoto, Saitama (JP); Genta Kokura, Saitama (JP); Tatsuya Shimizu, Saitama (JP)

(73) Assignee: ADEKA CORPORATION, Tokyo (JP)

( * ) Notice: Subject to any disclaimer, the term of this patent is extended or adjusted under 35 U.S.C. 154(b) by 0 days.

(21) Appl. No.: 15/531,566

(22) PCT Filed: Oct. 27, 2015

(86) PCT No.: PCT/JP2015/080259
§ 371 (c)(1),
(2) Date: May 30, 2017

(87) PCT Pub. No.: WO2016/111074
PCT Pub. Date: Jul. 14, 2016

(65) Prior Publication Data
US 2017/0342239 A1 Nov. 30, 2017

(30) Foreign Application Priority Data

Jan. 8, 2015 (JP) ................. 2015-002167

(51) Int. Cl.
*C08K 5/527* (2006.01)
*C08K 3/22* (2006.01)
*C08K 5/3462* (2006.01)
*C08K 5/3492* (2006.01)
*C08K 13/02* (2006.01)
*C08L 23/00* (2006.01)
*C08L 101/00* (2006.01)
*C09K 21/02* (2006.01)
*C09K 21/10* (2006.01)
*C09K 21/12* (2006.01)

(52) U.S. Cl.
CPC ............... *C08K 5/527* (2013.01); *C08K 3/22* (2013.01); *C08K 5/3462* (2013.01); *C08K 5/3492* (2013.01); *C08K 5/34928* (2013.01); *C08K 13/02* (2013.01); *C08L 23/00* (2013.01); *C08L 101/00* (2013.01); *C09K 21/02* (2013.01); *C09K 21/10* (2013.01); *C09K 21/12* (2013.01)

(58) Field of Classification Search
CPC ........ C08K 5/527; C08K 3/22; C08K 5/3462; C08K 5/3492; C08K 5/34928; C08K 13/02; C08L 23/00; C08L 101/00; C09K 21/02; C09K 21/10; C09K 21/12
USPC ........................................................ 524/100
See application file for complete search history.

(56) References Cited

U.S. PATENT DOCUMENTS

| 4,341,694 | A | 7/1982 | Halpern |
| 8,735,473 | B2 | 5/2014 | Fukushima et al. |
| 2003/0088000 | A1 | 5/2003 | Kimura et al. |
| 2010/0249286 | A1 | 9/2010 | Yamaki et al. |
| 2014/0288217 | A1* | 9/2014 | Hatanaka .......... C08K 3/22 |
| | | | 524/100 |

FOREIGN PATENT DOCUMENTS

| CN | 1335332 | A | | 2/2002 | |
| CN | 103827197 | A | | 5/2014 | |
| EP | 2311908 | | | 4/2011 | |
| JP | 58-17126 | | | 2/1983 | |
| JP | H09-124670 | | | 5/1997 | |
| JP | H09124670 | A | * | 5/1997 | |
| JP | 2004-137316 | | | 5/2004 | |
| JP | 2009-120717 | | | 6/2009 | |
| JP | 2013119575 | A | * | 6/2013 | ............... C08K 3/22 |
| JP | 2014-012704 | | | 1/2014 | |

OTHER PUBLICATIONS

Jiao et al., "Combustion Behavior of Intumescent Flame Retardant Polypropylene Composites", J. Fire Sci., vol. 26, Sep. 2008, pp. 455-469. (Year: 2008).*
JPH09124670A—machine translation (Year: 1997).*
Extended European Search Report for Application No. 15876947, dated Jul. 17, 2018.
International Search Report, PCT/JP2015/080259, dated Jan. 26, 2016.
Horacek "Intumescent Flame-Retarded Building Parts Manufactured From Polyolefines as Well as From Composites of Polyolefines and Bismaleinimides", Journal of Applied Polymer Science, 2012, 126(5), p. 1511-1526.

* cited by examiner

*Primary Examiner* — Ling Siu Choi
*Assistant Examiner* — Ronald Grinsted
(74) *Attorney, Agent, or Firm* — Young & Thompson

(57) ABSTRACT

Disclosed is a flame retardant composition having excellent flame retardancy and processability, providing a flame-retardant synthetic resin composition including this flame retardant composition and having excellent flame retardancy and processability. Specifically, the following components are used in combination: as component (A), 20 to 50 parts by mass of at least one type of melamine salt selected from the group consisting of melamine orthophosphate, melamine pyrophosphate, and melamine polyphosphate; as component (B), 50 to 80 parts by mass of at least one type of piperazine salt selected from the group consisting of piperazine orthophosphate, piperazine pyrophosphate, and piperazine polyphosphate (the total of component (A) and component (B) is 100 parts by mass); and as component (C), 0.01 to 20.0 parts by mass of a bicyclophosphoric ester compound represented by the following general formula (1). The details of formula (1) are as described in the Description.

8 Claims, No Drawings

FLAME RETARDANT COMPOSITION AND FLAME-RETARDANT SYNTHETIC RESIN COMPOSITION

TECHNICAL FIELD

The present invention relates to a flame retardant composition for synthetic resins, and a flame-retardant synthetic resin composition including the flame retardant composition, and relates to a flame retardant composition that has excellent flame retardancy and processability, and a flame-retardant synthetic resin composition that includes the flame retardant composition.

BACKGROUND ART

Synthetic resins have conventionally been widely used, for example, for construction materials, automobile parts, packaging materials, agricultural materials, housing materials for home appliances, and toys because of their excellent chemical and mechanical characteristics. Unfortunately, many synthetic resins are flammable and thus need flameproofing for some applications. A widely known flameproofing method is to use one or a combination of flame retardants, such as halogen-based flame retardants, inorganic phosphorus-based flame retardants typified by red phosphorus and polyphosphate-based flame retardants such as ammonium polyphosphate, organophosphorus-based flame retardants typified by triaryl phosphate ester compounds, metal hydroxides, and antimony oxide and melamine compounds which are flame-retardant assistants.

Particularly, flame retardants known to have excellent flame retardancy include intumescent flame retardants, i.e., flame retardants that include a salt between polyphosphoric acid or pyrophosphoric acid and a nitrogen-containing compound as a main component and that form a surface-swelling (intumescent) layer on combustion, thus achieving flame retardancy by preventing the diffusion of decomposition products and the transfer of heat. For example, Patent Literature 1 discloses such a flame retardant.

Patent Literature 2 proposes a flame retardant including, in combination, a nitrogen compound such as melamine phosphate or ammonium polyphosphate, and a bicyclic phosphate compound.

Unfortunately, these conventional flame retardants have insufficient flame retardancy, and have a drawback in that a large amount needs to be added to impart sufficient flame retardancy to a synthetic resin. However, the addition of a large amount of flame retardant, and/or poor dispersibility of the flame retardant to synthetic resin, may give rise to a need for a longer processing time, higher processing temperature, and increased screw rotation speed in a processing machine. This may overheat the resin, thus resulting in defective molding, such as foaming, and other problems in processability. Thus, there is a demand for a flame retardant having excellent flame retardancy and processability.

CITATION LIST

Patent Literature

Patent Literature 1: US 2003/0088000 A1
Patent Literature 2: U.S. Pat. No. 4,341,694

SUMMARY OF INVENTION

Technical Problem

Thus, an objective of the invention is to provide a flame retardant composition having excellent flame retardancy and processability, and to provide a flame-retardant synthetic resin composition that includes this flame retardant composition and that has excellent flame retardancy and processability.

Solution to Problem

As a result of diligent research to solve the aforementioned problems, Inventors have completed the invention.

The invention provides a flame retardant composition comprising 20 to 50 parts by mass of component (A) described below, 50 to 80 parts by mass of component (B) described below (the total of said component (A) and said component (B) is 100 parts by mass), and 0.01 to 20.0 parts by mass of component (C) described below:

component (A): at least one type of melamine salt selected from the group consisting of melamine orthophosphate, melamine pyrophosphate, and melamine polyphosphate;

component (B): at least one type of piperazine salt selected from the group consisting of piperazine orthophosphate, piperazine pyrophosphate, and piperazine polyphosphate; and component (C): a bicyclophosphoric ester compound represented by general formula (1) below:

[Chem. 1]

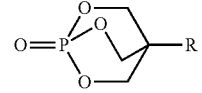

(1)

wherein R represents a $C_{1-4}$ alkyl group or a $C_{1-4}$ hydroxyalkyl group.

The present invention also provides a flame retardant composition further including 0.01 to 10 parts by mass of zinc oxide as component (D).

The present invention also provides a flame-retardant synthetic resin composition made by blending the aforementioned flame retardant composition to a synthetic resin.

The present invention also provides a flame-retardant synthetic resin composition, wherein the synthetic resin is a polyolefin-based resin.

The present invention also provides a shaped product obtained from the aforementioned flame-retardant synthetic resin composition.

Advantageous Effects of Invention

According to the present invention, it is possible to provide a flame retardant composition having excellent flame retardancy and processability. Also, according to the present invention, it is possible to provide a flame-retardant synthetic resin composition having excellent flame retardancy and processability. Also, according to the present invention, it is possible to provide a shaped product having excellent flame retardancy.

DESCRIPTION OF EMBODIMENTS

A flame retardant composition of the invention is described in detail below according to preferred embodiments thereof.

A melamine salt used as component (A) in the flame retardant composition of the present invention is selected from the group consisting of melamine orthophosphate, melamine pyrophosphate, and melamine polyphosphate; the salt may be used singly, or the salts may be used as a mixture. Among the above, melamine pyrophosphate is preferred from the viewpoint of flame retardancy, handleability, and storage stability. In cases of using a mixture, the higher the content rate of melamine pyrophosphate, the more preferable. The ratio between pyrophosphoric acid and melamine in melamine pyrophosphate is preferably 1:2 in molar ratio.

The aforementioned salts of the phosphoric acids and melamine can be obtained by reacting melamine with the corresponding phosphoric acid or phosphate. However, the melamine salt used as component (A) in the present invention is preferably melamine pyrophosphate or melamine polyphosphate obtained by subjecting monomelamine orthophosphate to heating and condensation, with melamine pyrophosphate being particularly preferable.

The piperazine salt used as component (B) in the flame retardant composition of the invention is selected from the group consisting of piperazine orthophosphate, piperazine pyrophosphate, and piperazine polyphosphate; the salt may be used singly, or the salts may be used as a mixture. Among the above, piperazine pyrophosphate is preferred from the viewpoint of flame retardancy, handleability, and storage stability. In cases of using a mixture, the higher the content rate of piperazine pyrophosphate, the more preferable. The ratio between pyrophosphoric acid and piperazine in piperazine pyrophosphate is preferably 1:1 in molar ratio.

The aforementioned salts of the phosphoric acids and piperazine can be obtained by reacting piperazine with the corresponding phosphoric acid or phosphate. However, the piperazine salt used as component (B) in the present invention is preferably piperazine pyrophosphate or piperazine polyphosphate obtained by subjecting monopiperazine diorthophosphate to heating and condensation, with piperazine pyrophosphate being particularly preferable.

The contents of component (A) and component (B) in the flame retardant composition of the invention when the total content of component (A) and component (B) is 100 parts by mass are 20 to 50 parts by mass of component (A) and 50 to 80 parts by mass of component (B), and preferably, 30 to 45 parts by mass of component (A) and 55 to 70 parts by mass of component (B).

Next, component (C) in the flame retardant composition of the invention is described.

Component (C) in the flame retardant composition of the invention is a bicyclophosphoric ester compound represented by the following general formula (1).

[Chem. 2]

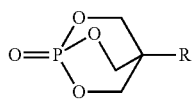
(1)

wherein R represents a $C_{1-4}$ alkyl group or a $C_{1-4}$ hydroxyalkyl group.

In the R in the aforementioned general formula (1), the $C_{1-4}$ alkyl group may be a linear alkyl group or a branched alkyl group, with examples including methyl, ethyl, propyl, isopropyl, butyl, isobutyl, sec-butyl, and tert-butyl groups. The $C_{1-4}$ hydroxyalkyl group may be a group in which a hydrogen atom in the aforementioned $C_{1-4}$ alkyl group is substituted by a hydroxy group, with examples including a hydroxymethyl group, a hydroxyethyl group, a hydroxypropyl group, and a hydroxybutyl group.

R is preferably a hydroxymethyl group from the viewpoint of flame retardancy and processability of the synthetic resin.

Examples of the bicyclophosphoric ester compound represented by the aforementioned general formula (1) of the invention include the following compounds Nos. 1 to 6. Compound No. 1 is preferred from the viewpoint of flame retardancy and processability of the synthetic resin.

[Chem. 3]

Compound No. 1

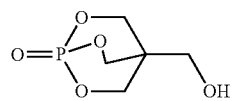

[Chem. 4]

Compound No. 2

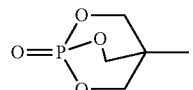

[Chem. 5]

Compound No. 3

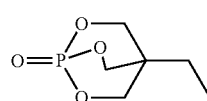

[Chem. 6]

Compound No. 4

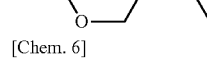

[Chem. 7]

Compound No. 5

[Chem. 8]

Compound No. 6

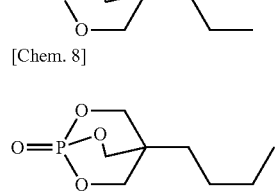

Bicyclophosphoric ester compounds represented by the aforementioned general formula (1) of the invention can be produced according to conventionally known methods, with examples including methods disclosed in U.S. Pat. No. 3,293,327, for example.

The content of the bicyclophosphoric ester compound which is component (C) in the flame retardant composition of the invention is from 0.01 to 20.0 parts by mass with respect to 100 parts by mass in total of the component (A) and the component (B), and preferably from 0.1 to 10.0 parts by mass, more preferably from 1.0 to 8.0 parts by mass, even more preferably from 3.0 to 8.0 parts by mass, from the viewpoint of flame retardancy and processability of the synthetic resin. If the content is less than 0.01 parts by mass, sufficient flame retardancy and processability cannot be obtained. If the content exceeds 20.0 parts by mass, the physical properties of the resin may be negatively affected.

The flame retardant composition of the invention may preferably include zinc oxide, which serves as a flame-retardant assistant, as component (D). The zinc oxide may be surface-treated. Commercially-available products of zinc oxide may be used, and usable examples include Zinc Oxide Type 1 (manufactured by Mitsui Mining and Smelting Co., Ltd.), partially-coated zinc oxide (manufactured by Mitsui Mining and Smelting Co., Ltd.), Nanofine 50 (ultrafine zinc oxide particles; average particle size: 0.02 µm; manufactured by Sakai Chemical Industry Co., Ltd.), and Nanofine K (ultrafine zinc oxide particles coated with zinc silicate; average particle size: 0.02 µm; manufactured by Sakai Chemical Industry Co., Ltd.).

The content of zinc oxide, as component (D), in the flame retardant composition of the present invention is preferably from 0.01 to 10 parts by mass, more preferably from 0.5 to 10 parts by mass, even more preferably from 1.0 to 7.5 parts by mass, with respect to 100 parts by mass in total of component (A) and component (B) from the viewpoint of flame retardancy.

The flame retardant composition of the invention may further include a silicone oil from the viewpoint of preventing the flame retardant powder from coagulating, improving storage stability, and improving dispersibility to synthetic resins.

Examples of silicone oils include: dimethyl silicone oils in which the side chains and terminals of a polysiloxane are all methyl groups; methylphenyl silicone oils in which some of the side chains and the terminals of a polysiloxane are methyl groups and some of the side chains are phenyl groups; methyl hydrogen silicone oils in which some of the side chains and the terminals of a polysiloxane are methyl groups and some of the side chains are hydrogen; and copolymers of the above. It is also possible to use modified silicone oils, such as amine-modified, epoxy-modified, alicyclic epoxy-modified, carboxyl-modified, carbinol-modified, mercapto-modified, polyether-modified, long-chain alkyl-modified, fluoroalkyl-modified, higher fatty acid ester-modified, higher fatty acid amide-modified, silanol-modified, diol-modified, phenol-modified, and/or aralkyl-modified silicone oils, in which organic groups are introduced into some of the side chains and/or terminals.

Concrete examples of the silicone oil are listed below. Examples of dimethyl silicone oils include KF-96 (manufactured by Shin-Etsu Chemical Co., Ltd.), KF-965 (manufactured by Shin-Etsu Chemical Co., Ltd.), and KF-968 (manufactured by Shin-Etsu Chemical Co., Ltd.). Examples of methyl hydrogen silicone oils include KF-99 (manufactured by Shin-Etsu Chemical Co., Ltd.), KF-9901 (manufactured by Shin-Etsu Chemical Co., Ltd.), HMS-151 (manufactured by Gelest Inc.), HMS-071 (manufactured by Gelest Inc.), HMS-301 (manufactured by Gelest Inc.), and DMS-H21 (manufactured by Gelest Inc.). Examples of methylphenyl silicone oils include KF-50 (manufactured by Shin-Etsu Chemical Co., Ltd.), KF-53 (manufactured by Shin-Etsu Chemical Co., Ltd.), KF-54 (manufactured by Shin-Etsu Chemical Co., Ltd.), and KF-56 (manufactured by Shin-Etsu Chemical Co., Ltd.). Examples of epoxy-modified products include X-22-343 (manufactured by Shin-Etsu Chemical Co., Ltd.), X-22-2000 (manufactured by Shin-Etsu Chemical Co., Ltd.), KF-101 (manufactured by Shin-Etsu Chemical Co., Ltd.), KF-102 (manufactured by Shin-Etsu Chemical Co., Ltd.), and KF-1001 (manufactured by Shin-Etsu Chemical Co., Ltd.). An example of a carboxyl-modified product includes X-22-3701E (manufactured by Shin-Etsu Chemical Co., Ltd.). Examples of carbinol-modified products include X-22-4039 (manufactured by Shin-Etsu Chemical Co., Ltd.) and X-22-4015 (manufactured by Shin-Etsu Chemical Co., Ltd.). An example of an amine-modified product includes KF-393 (manufactured by Shin-Etsu Chemical Co., Ltd.).

In the flame retardant composition of the invention, among the aforementioned silicone oils, methyl hydrogen silicone oils are preferred from the viewpoint of preventing the flame retardant powder from coagulating, improving storage stability, and improving dispersibility to synthetic resins.

In cases where the flame retardant composition of the invention includes a silicone oil, the content thereof is preferably from 0.01 to 5.0 parts by mass, more preferably from 0.05 to 3.0 parts by mass, even more preferably from 0.1 to 2.0 parts by mass, with respect to 100 parts by mass in total of the component (A) and the component (B) from the viewpoint of flame retardancy as well as preventing the flame retardant powder from coagulating, improving storage stability, and improving dispersibility to synthetic resins.

Furthermore, the flame retardant composition of the invention may further include a silane coupling agent in order to prevent the flame retardant powder from coagulating, improve storage stability, and impart water resistance and heat resistance.

Examples of silane coupling agents include: alkenyl group-containing silane coupling agents, such as vinyltrimethoxysilane, vinyltriethoxysilane, vinyltriacetoxysilane, vinyltris(2-methoxyethoxy)silane, vinylmethyldimethoxysilane, octenyltrimethoxysilane, allyltrimethoxysilane, and p-styryltrimethoxysilane; acryl group-containing silane coupling agents, such as 3-acryloxypropyltrimethoxysilane and 3-acryloxypropyltriethoxysilane; methacryl group-containing silane coupling agents, such as 3-methacryloxypropylmethyldimethoxysilane, 3-methacryloxypropyltrimethoxysilane, 3-methacryloxypropylmethyldiethoxysilane, 3-methacryloxypropyltriethoxysilane, and methacryloxyoctyltrimethoxysilane; epoxy group-containing silane coupling agents, such as 2-(3,4-epoxycyclohexyl)ethyltrimethoxysilane, 3-glycidoxypropylmethyldimethoxysilane, 3-glycidoxypropyltrimethoxysilane, 3-glycidoxypropylmethyldiethoxysilane, 3-glycidoxypropyltriethoxysilane, and glycidoxyoctyltrimethoxysilane; amino group-containing silane coupling agents, such as N-2-(aminoethyl)-3-aminopropylmethyldimethoxysilane, N-2-(aminoethyl)-3-aminopropyltrimethoxysilane, 3-aminopropyltrimethoxysilane, 3-aminopropyltriethoxysilane, 3-triethoxysilyl-N-(1,3-dimethyl-butylidene)propylamine, N-phenyl-3-aminopropyltrimethoxysilane, N,N'-bis[3-(trimethoxysilyl)propyl]ethylenediamine, and a hydrochloride of N-(vinylbenzyl)-2-aminoethyl-3-aminopropyltrimethoxysilane; isocyanurate group-containing silane coupling agents, such as tris-(trimethoxysilylpropyl)isocyanurate; mercapto group-containing silane coupling agents, such as 3-mercaptopropylmethyldimethoxysilane, 3-mercaptopropyltrimethoxysilane, and 3-mercaptopropyltriethoxysilane; ureido group-containing silane coupling agents, such as 3-ureidopropyltrimethoxysilane and 3-ureidopropyltriethoxysilane; sulfide group-containing silane coupling agents, such as bis(triethoxysilylpropyl)tetrasulfide; thioester group-containing silane coupling agents, such as 3-octanoylthio-1-propyltriethoxysilane; and isocyanate group-containing silane coupling agents, such as 3-isocyanate propyltriethoxysilane and 3-isocyanate propyltrimethoxysilane.

Among the aforementioned silane coupling agents, epoxy group-containing silane coupling agents are preferred from the viewpoint of preventing the flame retardant powder from coagulating, improving storage stability, and imparting water resistance and heat resistance.

Commercially available silane coupling agents can be used, with examples including: vinyltrimethoxysilane, such as KBM-1003 manufactured by Shin-Etsu Chemical Co., Ltd., A-171 manufactured by Momentive Performance Materials Japan LLC, Z-6300 manufactured by Dow Corning Toray Co., Ltd., GENIOSIL XL10 manufactured by Wacker Asahikasei Silicone Co., Ltd., and Sila-Ace 5210 manufactured by Nichibi Trading Co., Ltd.; vinyltriethoxysilane, such as KBE-1003 manufactured by Shin-Etsu Chemical Co., Ltd., A-151 manufactured by Momentive Performance Materials Japan LLC, Z-6519 manufactured by Dow Corning Toray Co., Ltd., GENIOSIL GF56 manufactured by Wacker Asahikasei Silicone Co., Ltd., and Sila-Ace 5220 manufactured by Nichibi Trading Co., Ltd.; vinyltriacetoxysilane, such as GENIOSIL GF62 manufactured by Wacker Asahikasei Silicone Co., Ltd.; vinyltris(2-methoxyethoxy)silane, such as A-172 manufactured by Momentive Performance Materials Japan LLC; vinylmethyldimethoxysilane, such as A-2171 manufactured by Momentive Performance Materials Japan LLC, and GENIOSIL XL12 manufactured by Wacker Asahikasei Silicone Co., Ltd.; octenyltrimethoxysilane, such as KBM-1083 manufactured by Shin-Etsu Chemical Co., Ltd.; allyltrimethoxysilane, such as Z-6825 manufactured by Dow Corning Toray Co., Ltd.; p-styryltrimethoxysilane, such as KBM-1403 manufactured by Shin-Etsu Chemical Co., Ltd.; 3-acryloxypropyltrimethoxysilane, such as KBM-5103; 3-methacryloxypropylmethyldimethoxysilane, such as KBM-502 manufactured by Shin-Etsu Chemical Co., Ltd., and Z-6033 manufactured by Dow Corning Toray Co., Ltd.; 3-methacryloxypropyltrimethoxysilane, such as KBM-503 manufactured by Shin-Etsu Chemical Co., Ltd., A-174 manufactured by Momentive Performance Materials Japan LLC, Z-6030 manufactured by Dow Corning Toray Co., Ltd., GENIOSIL GF31 manufactured by Wacker Asahikasei Silicone Co., Ltd., and Sila-Ace S710 manufactured by Nichibi Trading Co., Ltd.; 3-methacryloxypropylmethyldiethoxysilane, such as KBE-502 manufactured by Shin-Etsu Chemical Co., Ltd.; 3-methacryloxypropyltriethoxysilane, such as KBE-503 manufactured by Shin-Etsu Chemical Co., Ltd., and Y-9936 manufactured by Momentive Performance Materials Japan LLC; methacryloxyoctyltrimethoxysilane, such as KBM-5803 manufactured by Shin-Etsu Chemical Co., Ltd.; 2-(3,4-epoxycyclohexyl)ethyltrimethoxysilane, such as KBM-303 manufactured by Shin-Etsu Chemical Co., Ltd., A-186 manufactured by Momentive Performance Materials Japan LLC, Z-6043 manufactured by Dow Corning Toray Co., Ltd., and Sila-Ace 5530 manufactured by Nichibi Trading Co., Ltd.; 3-glycidoxypropylmethyldimethoxysilane, such as KBM-402 manufactured by Shin-Etsu Chemical Co., Ltd., Z-6044 manufactured by Dow Corning Toray Co., Ltd., and Sila-Ace 5520 manufactured by Nichibi Trading Co., Ltd.; 3-glycidoxypropyltrimethoxysilane, such as KBM-403 manufactured by Shin-Etsu Chemical Co., Ltd., A-187 manufactured by Momentive Performance Materials Japan LLC, Z-6040 manufactured by Dow Corning Toray Co., Ltd., GENIOSIL GF80 manufactured by Wacker Asahikasei Silicone Co., Ltd., Sila-Ace 5510 manufactured by Nichibi Trading Co., Ltd.; 3-glycidoxypropylmethyldiethoxysilane, such as KBE-402 manufactured by Shin-Etsu Chemical Co., Ltd.; 3-glycidoxypropyltriethoxysilane, such as KBE-403 manufactured by Shin-Etsu Chemical Co., Ltd., A-1871 manufactured by Momentive Performance Materials Japan LLC, and GENIOSIL GF82 manufactured by Wacker Asahikasei Silicone Co., Ltd.; glycidoxyoctyltrimethoxysilane, such as KBM-4803 manufactured by Shin-Etsu Chemical Co., Ltd.; N-2-(aminoethyl)-3-aminopropylmethyldimethoxysilane, such as KB M-602 manufactured by Shin-Etsu Chemical Co., Ltd., A-2120 manufactured by Momentive Performance Materials Japan LLC, GENIOSIL GF-95 manufactured by Wacker Asahikasei Silicone Co., Ltd., and Sila-Ace 5310 manufactured by Nichibi Trading Co., Ltd.; N-2-(aminoethyl)-3-aminopropyltrimethoxysilane, such as KBM-603 manufactured by Shin-Etsu Chemical Co., Ltd., A-1120 manufactured by Momentive Performance Materials Japan LLC, A-1122 manufactured by Momentive Performance Materials Japan LLC, Z-6020 manufactured by Dow Corning Toray Co., Ltd., Z-6094 manufactured by Dow Corning Toray Co., Ltd., GENIOSIL GF-91 manufactured by Wacker Asahikasei Silicone Co., Ltd., and Sila-Ace 5320 manufactured by Nichibi Trading Co., Ltd.; 3-aminopropyltrimethoxysilane, such as KBM-903 manufactured by Shin-Etsu Chemical Co., Ltd., A-1110 manufactured by Momentive Performance Materials Japan LLC, Z-6610 manufactured by Dow Corning Toray Co., Ltd., and Sila-Ace 5360 manufactured by Nichibi Trading Co., Ltd.; 3-aminopropyltriethoxysilane, such as KBE-903, A-1100 manufactured by Momentive Performance Materials Japan LLC, Z-6011 manufactured by Dow Corning Toray Co., Ltd., and Sila-Ace 5330 manufactured by Nichibi Trading Co., Ltd.; 3-triethoxysilyl-N-(1,3-dimethyl-butylidene)propylamine, such as KBE-9103, and Sila-Ace 5340 manufactured by Nichibi Trading Co., Ltd.; N-phenyl-3-aminopropyltrimethoxysilane, such as KBM-573 manufactured by Shin-Etsu Chemical Co., Ltd., Y-9669 manufactured by Momentive Performance Materials Japan LLC, and Z-6883 manufactured by Dow Corning Toray Co., Ltd.; N,N'-bis[3-(trimethoxysilyl)propyl]ethylenediamine, such as Sila-Ace XS1003 manufactured by Nichibi Trading Co., Ltd.; a hydrochloride of N-(vinylbenzyl)-2-aminoethyl-3-aminopropyltrimethoxysilane, such as KBM-575 manufactured by Shin-Etsu Chemical Co., Ltd., Z-6032 manufactured by Dow Corning Toray Co., Ltd., and Sila-Ace 5350 manufactured by Nichibi Trading Co., Ltd.; tris-(trimethoxysilylpropyl)isocyanurate, such as KBM-9659 manufactured by Shin-Etsu Chemical Co., Ltd.; 3-mercaptopropylmethyldimethoxysilane, such as KBM-802 manufactured by Shin-Etsu Chemical Co., Ltd., and Z-6852 manufactured by Dow Corning Toray Co., Ltd.; 3-mercaptopropyltrimethoxysilane, such as KBM-803 manufactured by Shin-Etsu Chemical Co., Ltd., A-189 manufactured by Momentive Performance Materials Japan LLC, Z-6062 manufactured by Dow Corning Toray Co., Ltd., and Sila-Ace 5810 manufactured by Nichibi Trading Co., Ltd.; 3-mercaptopropyltriethoxysilane, such as A-1891 manufactured by Momentive Performance Materials Japan LLC, and Z-6911 manufactured by Dow Corning Toray Co., Ltd.; 3-ureidopropyltriethoxysilane, such as A-1160 manufactured by Momentive Performance Materials Japan LLC; 3-ureidopropyltrialkoxysilane, such as KBE-585 manufactured by Shin-Etsu Chemical Co., Ltd.; bis(triethoxysilylpropyl)tetrasulfide, such as KBE-846 manufactured by Shin-Etsu Chemical Co., Ltd.; 3-octanoylthio-1-propyltriethoxysilane, such as A-LINK599 manufactured by Momentive Performance Materials Japan LLC; 3-isocyanate propyltriethoxysilane, such as KBE-9007 manufactured by Shin-Etsu Chemical Co., Ltd., and A-1310 manufactured by Momentive Performance Materials Japan LLC; and 3-isocyanate propyltrimethoxysilane, such as Y-5187 manufactured by Momentive Performance Materials Japan LLC, and GENIOSIL GF40 manufactured by Wacker Asahikasei Silicone Co., Ltd.

In cases where the flame retardant composition of the invention includes a silane coupling agent, the content thereof is preferably from 0.01 to 5.0 parts by mass, more preferably from 0.05 to 3.0 parts by mass, even more preferably from 0.1 to 2.0 parts by mass, with respect to 100 parts by mass in total of the component (A) and the component (B).

Further, the flame retardant composition of the invention may include, as necessary, an anti-drip agent in amounts that do not impair the effects of the present invention. Examples of anti-drip agents include fluorine-based anti-drip agents, silicone rubbers, and phyllosilicates.

Examples of phyllosilicates include smectite-based clay minerals, such as montmorillonite, saponite, hectorite, beidellite, stevensite, and nontronite; and vermiculite, halloysite, swelling mica, and talc. Organic cations, quaternary ammonium cations, or phosphonium cations may be intercalated between the layers.

Among the aforementioned anti-drip agents, fluorine-based anti-drip agents are particularly preferred. Concrete examples of fluorine-based anti-drip agents include: fluorine-based resins such as polytetrafluoroethylene, polyvinylidene fluoride, and polyhexafluoropropylene; and alkali metal salt compounds of perfluoroalkane sulfonic acids or alkaline-earth metal salts of perfluoroalkane sulfonic acids, such as sodium perfluoromethane sulfonate, potassium perfluoro-n-butane sulfonate, potassium perfluoro-t-butane sulfonate, sodium perfluorooctane sulfonate, and calcium perfluoro-2-ethylhexane sulfonate. Of the above anti-drip agents, polytetrafluoroethylene is most preferred from the viewpoint of drip preventability.

When the anti-drip agent is included, the content of the anti-drip agent is preferably from 0.005 to 5 parts by mass, more preferably from 0.01 to 5 parts by mass, even more preferably from 0.05 to 3 parts by mass, further preferably from 0.1 to 1 part by mass, with respect to 100 parts by mass in total of the component (A) and the component (B). If the content is less than 0.005 parts by mass, the drip-preventing effect may not be sufficient, and if the content exceeds 5 parts by mass, the characteristics of the resin may deteriorate.

The flame retardant composition of the invention may include, as necessary, a polyol compound as a flame-retardant assistant, in amounts that do not impair the effects of the present invention. A polyol compound is a compound in which a plurality of hydroxyl groups are bonded, and examples include pentaerythritol, dipentaerythritol, tripentaerythritol, polypentaerythritol, neopentyl glycol, trimethylol propane, ditrimethylol propane, 1,3,5-tris(2-hydroxyethyl)isocyanurate (THEIC), polyethylene glycol, glycerol, diglycerol, mannitol, maltitol, lactitol, sorbitol, erythritol, xylitol, xylose, sucrose, trehalose, inositol, fructose, maltose, and lactose. Of the above polyol compounds, one or more types of compounds selected from the group consisting of pentaerythritol and pentaerythritol condensates, such as pentaerythritol, dipentaerythritol, tripentaerythritol, and polypentaerythritol, are preferred; dipentaerythritol and pentaerythritol condensates are more preferred; and dipentaerythritol is most preferred. Also, THEIC and sorbitol can be suitably used.

When the polyol compound is included, the content thereof is preferably from 0.5 to 15 parts by mass, more preferably from 2 to 12 parts by mass, even more preferably from 5 to 10 parts by mass, with respect to 100 parts by mass in total of the component (A) and the component (B).

The flame retardant composition of the invention may include, as necessary, a lubricant in amounts that do not impair the effects of the present invention. Examples of lubricants include: purely hydrocarbon-based lubricants, such as liquid paraffin, natural paraffin, microwax, synthetic paraffin, low molecular-weight polyethylene, and polyethylene wax; halogenated hydrocarbon-based lubricants; fatty acid-based lubricants, such as higher fatty acids and oxyfatty acids; fatty acid amide-based lubricants, such as fatty acid amides and bis-fatty acid amides; ester-type lubricants, such as lower alcohol esters of fatty acids, polyol esters of fatty acids such as glyceride, polyglycol esters of fatty acids, and fatty alcohol esters of fatty acids (ester waxes); metal soap, fatty alcohols, polyols, polyglycols, polyglycerols, partial esters of fatty acids and polyols, partial ester lubricants of fatty acids and polyglycols or polyglycerols, silicone oils, and mineral oils. Two or more types of lubricants may be used. When lubricant(s) are included, the content thereof is preferably from 0.05 to 10 parts by mass, more preferably from 0.1 to 5 parts by mass, with respect to 100 parts by mass in total of the component (A) and the component (B).

The flame retardant composition of the invention may further include a hydrotalcite compound from the viewpoint of heat resistance, reducing the possibility of corrosion in processing machines and weather resistance. In the present invention, a hydrotalcite compound refers to a carbonate double salt compound of aluminum and magnesium and/or zinc. The hydrotalcite-based compound may be a naturally-occurring product or a synthetic product. Examples of methods for synthesizing such synthetic products include known methods disclosed, for example, in JP S46-2280B, JP S50-30039B, JP S51-29129B, and JP S61-174270A. In the invention, various hydrotalcite-based compounds may be used regardless of crystal structure, crystal grain system, the presence/absence of water of crystallization and the amount thereof, etc.

The hydrotalcite compound may be treated with perchloric acid. Also, it is possible to use a hydrotalcite compound whose surface is covered with, for example, a higher fatty acid such as stearic acid, a higher fatty acid metal salt such as an alkali metal salt of oleic acid, an organic sulfonic acid metal salt such as an alkali metal salt of dodecylbenzenesulfonic acid, a higher fatty acid amide, a higher fatty acid ester, or a wax.

For the hydrotalcite compound, it is possible to use a compound represented by the following general formula (4).

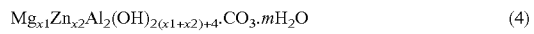

$$Mg_{x1}Zn_{x2}Al_2(OH)_{2(x1+x2)+4} \cdot CO_3 \cdot mH_2O \qquad (4)$$

(In the formula, x1 and x2 each represent a number satisfying the conditions represented by the following expressions, and m represents a real number: $0 \leq x2/x1 < 10$; and $2 \leq x1+x2 < 20$.)

Further, for the hydrotalcite compound, it is possible to use a zinc-modified hydrotalcite including zinc.

Commercially available products may be used for the hydrotalcite compound, with examples including DHT-4 (hydrotalcite; manufactured by Kyowa Chemical Industry Co., Ltd.), DHT-4A (hydrotalcite; manufactured by Kyowa Chemical Industry Co., Ltd.), Magceler 1 (hydrotalcite; manufactured by Kyowa Chemical Industry Co., Ltd.), Alcamizer 1 (hydrotalcite; manufactured by Kyowa Chemical Industry Co., Ltd.), Alcamizer 2 (hydrotalcite; manufactured by Kyowa Chemical Industry Co., Ltd.), Alcamizer 4 (Alcamizer P-93) (zinc-modified hydrotalcite; manufactured by Kyowa Chemical Industry Co., Ltd.), Alcamizer 7 (zinc-modified hydrotalcite; manufactured by Kyowa Chemical Industry Co., Ltd.), and Alcamizer 5 (perchloric acid-treated hydrotalcite; manufactured by Kyowa Chemical Industry Co., Ltd.), wherein DHT-4A (hydrotalcite; manufactured by Kyowa Chemical Industry Co., Ltd.) is particularly preferable.

The content of the hydrotalcite compound in the flame retardant composition of the invention is preferably from 0.01 to 5 parts by mass with respect to 100 parts by mass in total of the component (A) and the component (B). From the viewpoint of heat resistance and weather resistance and reducing the possibility of corrosion in processing machines, the content is more preferably from 0.05 to 4 parts by mass, even more preferably from 0.1 to 2 parts by mass.

In the flame retardant composition of the present invention, it is possible to use, as necessary, one or more types of non-halogen-containing organic/inorganic flame retardants or flame-retardant assistants in amounts that do not impair the effects of the present invention. Examples of such flame retardants/flame-retardant assistants include triazine-ring-containing compounds, metal hydroxides, phosphoric-ester-based flame retardants, condensed-phosphoric-ester-based flame retardants, phosphate-based flame retardants, inorganic phosphorus-based flame retardants, dialkylphosphinate salts, silicone-based flame retardants, metal oxides, boric acid compounds, swelling graphite, other inorganic flame-retardant assistants, and other organic flame retardants.

Examples of the triazine-ring-containing compounds include melamine, ammeline, benzoguanamine, acetoguanamine, phthalodiguanamine, melamine cyanurate, butylene diguanamine, norbornene diguanamine, methylene diguanamine, ethylene dimelamine, trimethylene dimelamine, tetramethylene dimelamine, hexamethylene dimelamine, and 1,3-hexylene dimelamine.

Examples of the metal hydroxides include magnesium hydroxide, aluminum hydroxide, calcium hydroxide, barium hydroxide, zinc hydroxide, and Kisuma 5A (trade name of magnesium hydroxide; manufactured by Kyowa Chemical Industry Co., Ltd.).

Examples of the phosphoric-ester-based flame retardants include trimethyl phosphate, triethyl phosphate, tributyl phosphate, tributoxyethyl phosphate, trischloroethyl phosphate, trisdichloropropyl phosphate, triphenyl phosphate, tricresyl phosphate, cresyl diphenyl phosphate, trixylenyl phosphate, octyl diphenyl phosphate, xylenyl diphenyl phosphate, trisisopropylphenyl phosphate, 2-ethylhexyl diphenyl phosphate, t-butylphenyl diphenyl phosphate, bis-(t-butylphenyl) phenyl phosphate, tris-(t-butylphenyl) phosphate, isopropylphenyl diphenyl phosphate, bis-(isopropylphenyl) diphenyl phosphate, and tris-(isopropylphenyl) phosphate.

Examples of the condensed-phosphoric-ester-based flame retardants include 1,3-phenylene bis(diphenyl phosphate), 1,3-phenylene bis(dixylenyl phosphate), and bisphenol A bis(diphenyl phosphate).

An example of the inorganic phosphorus-based flame retardant includes red phosphorus.

Examples of the dialkylphosphinate salts include aluminum diethylphosphinate and zinc diethylphosphinate.

Examples of other inorganic flame-retardant assistants include inorganic compounds such as titanium oxide, aluminum oxide, magnesium oxide, and hydrotalcite, and surface-treated products thereof. As concrete examples thereof, it is possible to use various commercially-available products, such as Tipaque R-680 (trade name of titanium oxide; manufactured by Ishihara Sangyo Kaisha, Ltd.), Kyowa Mag 150 (trade name of magnesium oxide; manufactured by Kyowa Chemical Industry Co., Ltd.), DHT-4A (hydrotalcite; manufactured by Kyowa Chemical Industry Co., Ltd.), and Alcamizer 4 (trade name of zinc-modified hydrotalcite; manufactured by Kyowa Chemical Industry Co., Ltd.).

The flame retardant composition used in the invention may include, as necessary, a phenol-based antioxidant, a phosphorus-based antioxidant, a thioether-based antioxidant, a UV absorber, a hindered-amine-based light stabilizer, an anti-aging agent, and the like. These components may be blended in advance to the flame retardant composition of the invention, or may be blended to a synthetic resin at the time of blending the flame retardant composition to the synthetic resin. It is preferable to stabilize the synthetic resin by blending these components.

Examples of the phenol-based antioxidant include 2,6-di-tert-butyl-p-cresol, 2,6-diphenyl-4-octadesiloxyphenol, distearyl(3,5-di-tert-butyl-4-hydroxybenzyl)phosphonate, 1,6-hexamethylene-bis[(3,5-di-tert-butyl-4-hydroxyphenyl) propionic acid amide], 4,4'-thio-bis(6-tert-butyl-m-cresol), 2,2'-methylene-bis(4-methyl-6-tert-butylphenol), 2,2'-methylene-bis(4-ethyl-6-tert-butylphenol), 4,4'-butylidene-bis(6-tert-butyl-m-cresol), 2,2'-ethylidene-bis(4,6-di-tert-butylphenol), 2,2'-ethylidene-bis(4-sec-butyl-6-tert-butylphenol), 1,1,3-tris(2-methyl-4-hydroxy-5-tert-butylphenyl)butane, 1,3,5-tris(2,6-dimethyl-3-hydroxy-4-tert-butylbenzyl)isocyanurate, 1,3,5-tris(3,5-di-tert-butyl-4-hydroxybenzyl)isocyanurate, 1,3,5-tris(3,5-di-tert-butyl-4-hydroxybenzyl)-2,4,6-trimethylbenzene, 2-tert-butyl-4-methyl-6-(2-acryloyloxy-3-tert-butyl-5-methylbenzyl)phenol, stearyl(3,5-di-tert-butyl-4-hydroxyphenyl)propionate, tetrakis[methyl 3-(3,5-di-tert-butyl-4-hydroxyphenyl)propionate]methane, thiodiethylene glycol bis[(3,5-di-tert-butyl-4-hydroxyphenyl)propionate], 1,6-hexamethylene-bis[(3,5-di-tert-butyl-4-hydroxyphenyl)propionate], bis[3,3-bis(4-hydroxy-3-tert-butylphenyl)butyric acid] glycol ester, bis[2-tert-butyl-4-methyl-6-(2-hydroxy-3-tert-butyl-5-methylbenzyl)phenyl] terephthalate, 1,3,5-tris[(3,5-di-tert-butyl-4-hydroxyphenyl) propionyloxyethyl] isocyanurate, 3,9-bis[1,1-dimethyl-2-{(3-tert-butyl-4-hydroxy-5-methylphenyl) propionyloxy}ethyl]-2,4,8,10-tetraoxaspiro[5,5]undecane, and triethylene glycol bis[(3-tert-butyl-4-hydroxy-5-methylphenyl)propionate].

The amount of the phenol-based antioxidant(s) used when blended with a synthetic resin is preferably from 0.001 to 5 mass %, more preferably from 0.05 to 3 mass %, in the synthetic resin composition.

Examples of the phosphorus-based antioxidant include trisnonylphenyl phosphite, tris[2-tert-butyl-4-(3-tert-butyl-4-hydroxy-5-methylphenylthio)-5-methylphenyl] phosphite, tridecyl phosphite, octyldiphenyl phosphite, di(decyl) monophenyl phosphite, di(tridecyl)pentaerythritol diphosphite, di(nonylphenyl)pentaerythritol diphosphite, bis (2,4-di-tert-butylphenyl)pentaerythritol diphosphite, bis(2,6-di-tert-butyl-4-methylphenyl)pentaerythritol diphosphite, bis(2,4,6-tri-tert-butylphenyl)pentaerythritol diphosphite, bis(2,4-dicumylphenyl)pentaerythritol diphosphite, tetra(tridecyl)isopropylidenediphenol diphosphite, tetra(tridecyl)-4,4'-n-butylidene bis(2-tert-butyl-5-methylphenol) diphosphite, hexa(tridecyl)-1,1,3-tris(2-methyl-4-hydroxy-5-tert-butylphenyl)butane triphosphite, tetrakis(2,4-di-tert-butylphenyl)biphenylene diphosphonite, 9,10-dihydro-9-oxa-10-phosphaphenanthrene-10-oxide, 2,2'-methylene-bis (4,6-tert-butylphenyl)-2-ethylhexyl phosphite, 2,2'-methylene-bis(4,6-tert-butylphenyl)-octadecyl phosphite, 2,2'-ethylidene-bis(4,6-di-tert-butylphenyl)fluorophosphite, tris(2-[(2,4,8,10-tetrakis-tert-butyldibenzo[d,f][1,3,2]dioxaphosphepin-6-yl)oxy]ethyl)amine, and a phosphite of 2-ethyl-2-butylpropylene glycol and 2,4,6-tri-tert-butylphenol. The amount of the phosphorus-based antioxidant(s)

used when blended with a synthetic resin is preferably from 0.001 to 5 mass %, more preferably from 0.05 to 3 mass %, in the synthetic resin composition.

Examples of the thioether-based antioxidant include dialkyl thiodipropionates, such as dilauryl thiodipropionate, dimyristyl thiodipropionate, and distearyl thiodipropionate, and pentaerythritol tetra(β-alkylthiopropionate) esters. The amount of the thioether-based antioxidant(s) used when blended with a synthetic resin is preferably from 0.001 to 5 mass %, more preferably from 0.05 to 3 mass %, in the synthetic resin composition.

Examples of the UV absorber include: 2-hydroxybenzophenones such as 2,4-dihydroxybenzophenone, 2-hydroxy-4-methoxybenzophenone, 2-hydroxy-4-octoxybenzophenone, and 5,5'-methylene-bis(2-hydroxy-4-methoxybenzophenone); 2-(2'-hydroxyphenyl) benzotriazoles such as 2-(2'-hydroxy-5'-methylphenyl) benzotriazole, 2-(2'-hydroxy-3',5'-di-tert-butylphenyl)-5-chlorobenzotriazole, 2-(2'-hydroxy-3'-tert-butyl-5'-methylphenyl)-5-chlorobenzotriazole, 2-(2'-hydroxy-5'-tert-octylphenyl)benzotriazole, 2-(2'-hydroxy-3',5'-dicumylphenyl)benzotriazole, 2,2'-methylene-bis(4-tert-octyl-6-(benzotriazolyephenol), and 2-(2'-hydroxy-3'-tert-butyl-5'-carboxyphenyl)benzotriazole; benzoates such as phenyl salicylate, resorcinol monobenzoate, 2,4-di-tert-butylphenyl-3,5-di-tert-butyl-4-hydroxybenzoate, 2,4-di-tert-amylphenyl-3,5-di-tert-butyl-4-hydroxybenzoate, and hexadecyl-3,5-di-tert-butyl-4-hydroxybenzoate; substituted oxanilides such as 2-ethyl-2'-ethoxyoxanilide and 2-ethoxy-4'-dodecyloxanilide; cyanoacrylates such as ethyl-α-cyano-β,β-diphenylacrylate and methyl-2-cyano-3-methyl-3-(p-methoxyphenyl)acrylate; and triaryltriazines such as 2-(2-hydroxy-4-octoxyphenyl)-4,6-bis(2,4-di-tert-butylphenyl)-s-triazine, 2-(2-hydroxy-4-methoxyphenyl)-4,6-diphenyl-s-triazine, and 2-(2-hydroxy-4-propoxy-5-methylphenyl)-4,6-bis(2,4-di-tert-butylphenyl)-s-triazine. The amount of the UV absorber(s) used when blended with a synthetic resin is preferably from 0.001 to 5 mass %, more preferably from 0.05 to 3 mass %, in the synthetic resin composition.

Examples of the hindered-amine-based light stabilizer include hindered-amine compounds such as 2,2,6,6-tetramethyl-4-piperidyl stearate, 1,2,2,6,6-pentamethyl-4-piperidyl stearate, 2,2,6,6-tetramethyl-4-piperidyl benzoate, bis(2,2,6,6-tetramethyl-4-piperidyl) sebacate, bis(1,2,2,6,6-tetramethyl-4-piperidyl) sebacate, bis(1-octoxy-2,2,6,6-tetramethyl-4-piperidyl) sebacate, tetrakis(2,2,6,6-tetramethyl-4-piperidyl)-1,2,3,4-butane tetracarboxylate, tetrakis(1,2,2,6,6-pentamethyl-4-piperidyl)-1,2,3,4-butane tetracarboxylate, bis(2,2,6,6-tetramethyl-4-piperidyl).di(tridecyl)-1,2,3,4-butane tetracarboxylate, bis(1,2,2,6,6-pentamethyl-4-piperidyl).di(tridecyl)-1,2,3,4-butane tetracarboxylate, bis(1,2,2,4,4-pentamethyl-4-piperidyl)-2-butyl-2-(3,5-di-tert-butyl-4-hydroxybenzyl) malonate, 1-(2-hydroxyethyl)-2,2,6,6-tetramethyl-4-piperidinol/diethyl succinate polycondensate, 1,6-bis(2,2,6,6-tetramethyl-4-piperidylamino)hexane/2,4-dichloro-6-morpholino-s-triazine polycondensate, 1,6-bis(2,2,6,6-tetramethyl-4-piperidylamino)hexane/2,4-dichloro-6-tert-octylamino-s-triazine polycondensate, 1,5,8,12-tetrakis[2,4-bis(N-butyl-N-(2,2,6,6-tetramethyl-4-piperidyl)amino)-s-triazin-6-yl]-1,5,8,12-tetraazadodecane, 1,5,8,12-tetrakis[2,4-bis(N-butyl-N-(1,2,2,6,6-pentamethyl-4-piperidyl)amino)-s-triazin-6-yl]-1,5,8,12-tetraazadodecane, 1,6,11-tris[2,4-bis(N-butyl-N-(2,2,6,6-tetramethyl-4-piperidyl)amino)-s-triazin-6-yl] aminoundecane, and 1,6,11-tris[2,4-bis(N-butyl-N-(1,2,2,6,6-pentamethyl-4-piperidyl)amino)-s-triazin-6-yl] aminoundecane. The amount of the hindered-amine-based light stabilizer(s) used when blended with a synthetic resin is preferably from 0.001 to 5 mass %, more preferably from 0.05 to 3 mass %, in the synthetic resin composition.

Examples of the anti-aging agent include naphthylamine-based agents, diphenylamine-based agents, p-phenyldiamine-based agents, quinoline-based agents, hydroquinone derivatives, monophenol-based agents, thiobisphenol-based agents, hindered-phenol-based agents, and phosphite ester-based agents. The amount of the anti-aging agent(s) used when blended with a synthetic resin is preferably from 0.001 to 5 mass %, more preferably from 0.05 to 3 mass %, in the synthetic resin composition.

The flame retardant composition of the present invention may include, as optional components, reinforcement materials in amounts that do not impair the effects of the present invention. These components may be blended to a synthetic resin at the time of blending the flame retardant composition of the invention to the synthetic resin. Fibrous, tabular, granular, or powdery reinforcement materials that are generally used for the reinforcement of synthetic resins may be used as the reinforcement materials. Concrete examples include: inorganic fibrous reinforcement materials, such as glass fiber, asbestos fiber, carbon fiber, graphite fiber, metallic fiber, potassium titanate whisker, aluminum borate whisker, magnesium-based whisker, silicon-based whisker, wollastonite, sepiolite, asbestos, slag fiber, Zonolite, ellestadite, gypsum fiber, silica fiber, silica-alumina fiber, zirconia fiber, boron nitride fiber, silicon nitride fiber, and boron fiber; organic fibrous reinforcement materials, such as polyester fiber, nylon fiber, acrylic fiber, regenerated cellulose fiber, acetate fiber, kenaf, ramie, cotton, jute, hemp, sisal, flax, linen, silk, Manila hemp, sugarcane, wood pulp, scrap paper, waste paper, and wool; and tabular/granular reinforcement materials, such as glass flakes, non-swelling mica, graphite, metal foil, ceramic beads, clay, mica, sericite, zeolite, bentonite, dolomite, kaoline, micronized silicate, feldspar powder, potassium titanate, Shirasu balloons, calcium carbonate, magnesium carbonate, barium sulfate, calcium oxide, aluminum oxide, titanium oxide, aluminum silicate, silicon oxide, gypsum, novaculite, dawsonite, and white clay. These reinforcement materials may be coated or bundled with a thermoplastic resin, such as an ethylene/vinyl acetate copolymer, or a thermosetting resin, such as epoxy resin, or may be treated with, for example, a coupling agent such as aminosilane or epoxy silane.

The flame retardant composition of the present invention may further include, as an optional component, a crystal nucleator in an amount that does not impair the effects of the present invention. Any nucleator generally used as a polymer crystal nucleator may be used as appropriate as the crystal nucleator. In the present invention, both inorganic and organic crystal nucleators may be used. These components may be blended to a synthetic resin at the time of blending the flame retardant composition of the invention to the synthetic resin.

Concrete examples of inorganic crystal nucleators include kaolinite, synthetic mica, clay, zeolite, silica, graphite, carbon black, magnesium oxide, titanium oxide, calcium sulfide, boron nitride, calcium carbonate, barium sulfate, aluminum oxide, neodymium oxide, and metal salts of phenylphosphonate etc. These inorganic-based crystal nucleators may be modified by organic substances in order to improve their dispersibility in the composition.

Concrete examples of organic crystal nucleators include: organic carboxylate metal salts, such as sodium benzoate, potassium benzoate, lithium benzoate, calcium benzoate, magnesium benzoate, barium benzoate, lithium terephthalate, sodium terephthalate, potassium terephthalate, calcium oxalate, sodium laurate, potassium laurate, sodium myristate, potassium myristate, calcium myristate, sodium octacosanoate, calcium octacosanoate, sodium stearate, potassium stearate, lithium stearate, calcium stearate, magnesium stearate, barium stearate, sodium montanate, calcium montanate, toluic acid sodium salt, sodium salicylate, potassium salicylate, zinc salicylate, aluminum dibenzoate, potassium dibenzoate, lithium dibenzoate, sodium β-naphthalate, and sodium cyclohexane carboxylate; organic sulfonate salts, such as sodium p-toluenesulfonate and sodium sulfoisophthalate; carboxylic acid amides, such as stearamide, ethylene-bis-lauric acid amide, palmitic acid amide, hydroxystearamide, erucamide, and trimesic acid tris(t-butylamide); benzylidenesorbitol and derivatives thereof; phosphorus compound metal salts, such as sodium 2,2'-methylene-bis(4,6-di-t-butylphenyl)phosphate; and sodium 2,2-methylbis(4,6-di-t-butylphenyl).

The flame retardant composition of the invention may further include, as an optional component, an acrylic processing aid in an amount that does not impair the effects of the invention. It is possible to use an acrylic processing aid made by polymerizing one type of (meth)acrylic ester or by copolymerizing two or more types of (meth)acrylic esters. The component(s) may be added to a synthetic resin at the time of blending the flame retardant composition of the invention with the synthetic resin. Examples of (meth)acrylic esters to be polymerized/copolymerized include (meth)acrylic esters such as methyl acrylate, methyl methacrylate, ethyl acrylate, ethyl methacrylate, n-propyl acrylate, isopropyl acrylate, n-propyl methacrylate, isopropyl methacrylate, n-butyl acrylate, isobutyl acrylate, t-butyl methacrylate, n-hexyl acrylate, n-hexyl methacrylate, 2-ethylhexyl acrylate, 2-ethylhexyl methacrylate, dodecyl methacrylate, and tridecyl methacrylate. Examples other than the above include (meth)acrylic acid and (meth)acrylic esters that include a hydroxy group.

The flame retardant composition of the present invention may include, as an optional component, a plasticizer in an amount that does not impair the effects of the present invention. Any plasticizer generally used as a polymer plasticizer may be used as appropriate as the plasticizer, and examples include polyester-based plasticizers, glycerol-based plasticizers, polycarboxylic acid ester-based plasticizers, polyalkylene glycol-based plasticizers, and epoxy-based plasticizers. These components may be blended to a synthetic resin at the time of blending the flame retardant composition of the invention to the synthetic resin.

Concrete examples of polyester-based plasticizers include: polyesters of an acid component, such as adipic acid, sebacic acid, terephthalic acid, isophthalic acid, naphthalene dicarboxylic acid, diphenyldicarboxylic acid, and rosin, and a diol component, such as propylene glycol, 1,3-butane diol, 1,4-butane diol, 1,6-hexane diol, ethylene glycol, and diethylene glycol; and polyesters consisting of hydroxycarboxylic acids, such as polycaprolactone. The terminals of these polyester-based plasticizers may be blocked by a monofunctional carboxylic acid or a monofunctional alcohol, or may be blocked by an epoxy compound, etc.

Concrete examples of the glycerol-based plasticizers include glycerol monoacetomonolaurate, glycerol diacetomonolaurate, glycerol monoacetomonostearate, glycerol diacetomonooleate, and glycerol monoacetomonomontanate.

Concrete examples of polycarboxylic acid ester-based plasticizers include: phthalate esters, such as dimethyl phthalate, diethyl phthalate, dibutyl phthalate, dioctyl phthalate, diheptyl phthalate, dibenzyl phthalate, and butyl benzyl phthalate; trimellitate esters, such as tributyl trimellitate, trioctyl trimellitate, and trihexyl trimellitate; adipate esters, such as diisodecyl adipate, n-octyl-n-decyl adipate, methyldiglycol butyldiglycol adipate, benzyl methyl diglycol adipate, and benzyl butyl diglycol adipate; citrate esters, such as triethyl acetylcitrate and tributyl acetylcitrate; azelate esters, such as di-2-ethylhexyl azelate; and sebacate esters, such as dibutyl sebacate and di-2-ethylhexyl sebacate.

Concrete examples of polyalkylene glycol-based plasticizers include: polyalkylene glycols, such as polyethylene glycol, polypropylene glycol, poly(ethylene oxide-propylene oxide) block and/or random copolymers, polytetramethylene glycol, ethylene oxide addition polymers of bisphenols, propylene oxide addition polymers of bisphenols, tetrahydrofuran addition polymers of bisphenols; and terminal-blocked compounds thereof, such as terminal-epoxy-modified compounds, terminal-ester-modified compounds, and terminal-ether-modified compounds.

An epoxy-based plasticizer generally refers, for example, to an epoxy triglyceride consisting of alkyl epoxy stearate and soybean oil, but so-called epoxy resins, which mainly employ bisphenol A and epichlorohydrin as materials, may be used.

Concrete examples of other plasticizers include benzoic acid esters of aliphatic polyols such as neopentyl glycol dibenzoate, diethylene glycol dibenzoate, and triethylene glycol di-2-ethylbutyrate, fatty acid amides such as stearamide, aliphatic carboxylic acid esters such as butyl oleate, oxyacid esters such as methyl acetylricinoleate and butyl acetylricinoleate, pentaerythritol, various sorbitols, polyacrylic esters, and paraffins.

Only one type of plasticizer may be used, or two or more types of plasticizers may be used in combination, in cases of using plasticizer(s) in the present invention.

Further, if necessary, the flame retardant composition of the present invention may include additives generally used for synthetic resins in amounts that do not impair the effects of the present invention, such as cross-linking agents, antistatic agents, metal soaps, fillers, antifogging agents, antiplate-out agents, surface-treating agents, fluorescers, fungicides, bactericides, foaming agents, metal deactivators, mold-release agents, pigments, and processing aids other than the aforementioned acrylic processing aids. These components may be blended to a synthetic resin at the time of blending the flame retardant composition of the invention to the synthetic resin.

In order to obtain the flame retardant composition of the invention, components (A) to (C), which are essential components, and component (D), which may be added as necessary, simply need to be mixed, together with other optional components as necessary. For mixing, one of various types of mixers can be used. Heating can be performed while mixing. Examples of usable mixers include tumbler mixers, Henschel mixers, ribbon blenders, V-type mixers, W-type mixers, super mixers, and Nauta mixers.

The flame retardant composition of the present invention is effective for the flame-proofing of synthetic resins, and is used preferably as a flame-retardant synthetic resin composition (referred to hereinafter also as "flame-retardant synthetic resin composition of the invention") by being blended with a synthetic resin.

Concrete examples of synthetic resins that are flame-proofed by the flame retardant composition of the present invention include thermoplastic resins, and blends thereof, such as: polyolefins and copolymers thereof, e.g., α-olefin polymers, such as polypropylene, high-density polyethylene, low-density polyethylene, linear low-density polyethylene, cross-linked polyethylene, ultra-high-molecular-weight polyethylene, polybutene-1, and poly-3-methylpentene, ethylene-vinyl acetate copolymer, ethylene-ethyl acrylate copolymer, and ethylene-propylene copolymer; halogen-containing resins, such as polyvinyl chloride, polyvinylidene chloride, chlorinated polyethylene, chlorinated polypropylene, polyvinylidene fluoride, chlorinated rubber, vinyl chloride-vinyl acetate copolymer, vinyl chloride-ethylene copolymer, vinyl chloride-vinylidene chloride copolymer, vinyl chloride-vinylidene chloride-vinyl acetate terpolymer, vinyl chloride-acrylic ester copolymer, vinyl chloride-maleic ester copolymer, and vinyl chloride-cyclohexyl maleimide copolymer; petroleum resin; coumarone resin; polystyrene; polyvinyl acetate; acrylic resin; polymethyl methacrylate; polyvinyl alcohol; polyvinyl formal; polyvinyl butyral; linear polyesters, e.g., polyalkylene terephthalates such as polyethylene terephthalate, polybutylene terephthalate, and polycyclohexane dimethylene terephthalate, aromatic polyesters e.g. polyalkylene naphthalates such as polyethylene naphthalate and polybutylene naphthalate, and polytetramethylene terephthalate; degradable aliphatic polyesters, such as polyhydroxybutyrate, polycaprolactone, polybutylene succinate, polyethylene succinate, polylactic resin, polymalic acid, polyglycolic acid, polydioxane, and poly(2-oxetanone); polyphenylene oxide; polyamides such as polycaprolactam and polyhexamethylene adipamide; polycarbonate; branched polycarbonate; polyacetal; polyphenylene sulfide; polyurethane; and cellulose-based resin. Other examples include: thermosetting resins, such as phenolic resin, urea resin, melamine resin, epoxy resin, and unsaturated polyester resin; fluorine-based resin; silicone resin; silicone rubber polyether sulfone; polysulfone; polyphenylene ether; polyether ketone; polyether ether ketone; and liquid crystal polymers. Further, other examples include isoprene rubber, butadiene rubber, acrylonitrile-butadiene copolymer rubber, styrene-butadiene copolymer rubber, fluorine rubber, and silicone rubber.

Concrete examples of synthetic resins to be flame-proofed further include: olefin-based thermoplastic elastomers, styrene-based thermoplastic elastomers, polyester-based thermoplastic elastomers, nitrile-based thermoplastic elastomers, nylon-based thermoplastic elastomers, vinyl chloride-based thermoplastic elastomers, polyamide-based thermoplastic elastomers, and polyurethane-based thermoplastic elastomers.

One type, or two or more types of these synthetic resins may be used, or the synthetic resins may be alloyed.

Any type of synthetic resin may be used in the present invention, regardless of factors such as molecular weight, degree of polymerization, density, softening point, the proportion of portions insoluble to a solvent, the degree of stereoregularity, presence/absence of catalyst residue, types and content ratio of monomers which are the starting materials, and types of polymerization catalysts (e.g., Ziegler catalyst, metallocene catalyst, etc.).

Among the aforementioned synthetic resins, polyolefin-based resins are preferable from the viewpoint that excellent flame retardancy can be imparted.

Examples of polyolefin-based resins include: α-olefin polymers, such as polyethylene, low-density polyethylene, linear low-density polyethylene, high-density polyethylene, polypropylene, homopolypropylene, random copolymer polypropylene, block copolymer polypropylene, impact copolymer polypropylene, high-impact copolymer polypropylene, isotactic polypropylene, syndiotactic polypropylene, hemiisotactic polypropylene, maleic anhydride-modified polypropylene, polybutene, cycloolefin polymer, stereoblock polypropylene, poly-3-methyl-1-butene, poly-3-methyl-1-pentene, and poly-4-methyl-1-pentene; and α-olefin copolymers, such as ethylene/propylene block or random copolymer, ethylene-methyl methacrylate copolymer, and ethylene-vinyl acetate copolymer.

The flame-retardant synthetic resin composition of the invention includes component (A), component (B), and component (C), and when further including component (D), the total content of component (D) is preferably greater than or equal to 10 mass % to less than 50 mass %, more preferably greater than or equal to 15 mass % to less than 40 mass %, even more preferably greater than or equal to 18 mass % to less than 30 mass %, and further preferably greater than or equal to 20 mass % to less than 25 mass %, from the viewpoint of flame retardancy. If the content is less than 10 mass %, flame retardancy may be insufficient, whereas if the content is 50 mass % or greater, the physical properties intrinsic to the resin may be impaired.

A shaped product having excellent flame retardancy can be produced by shaping the flame-retardant synthetic resin composition of the present invention. There is no particular limitation to the methods for shaping, and examples thereof include extrusion, calendering, injection molding, rolling, compression molding, and blow molding. Various shaped products having a variety of shapes can be manufactured, such as resin plates, sheets, films, and odd-form components.

The flame-retardant synthetic resin composition of the invention can be used, for example, for housings (frames, casings, covers, exterior materials) and components of electric vehicles, machines, electrical/electronic equipment, and office-automation equipment, and for automotive interior/exterior materials, and can be used in applications requiring the UL94 5VA standard.

The flame-retardant synthetic resin composition and the shaped product according to the present invention can be used in a wide variety of industries, such as electricity, electronics, telecommunications, agriculture, forestry, fisheries, mining, construction, foods, textiles, clothing, medical products/services, coal, oil, rubber, leather, automobiles, precision instruments, lumber, construction materials, civil engineering, furniture, printing, and musical instruments. More specifically, the present invention can be used for: office supplies and office-automation equipment such as printers, personal computers, word processors, keyboards, PDAs (or compact information terminals), telephones, copying machines, facsimile machines, ECRs (electronic cash registers), calculators, electronic organizers, cards, holders, and stationery; home electrical appliances such as washing machines, refrigerators, vacuum cleaners, microwave ovens, lighting fixtures, game devices, irons, and foot warmers; audio-visual equipment such as TVs, videocassette recorders, video cameras, radio-cassette recorders, tape recorders, mini discs, CD players, loudspeakers, and liquid crystal displays; electrical/electronic components and telecommunications equipment such as connectors, relays, capacitors, switches, printed-circuit boards, coil bobbins, sealing materials for semiconductors, sealing materials for LEDs, electrical wires, cables, transformers, deflection yokes, distribution switchboards, and clocks; housings (frames, casings, covers, exterior materials) and components of office-automation equipment, etc.; and automotive interior/exterior materials.

Furthermore, the flame-retardant synthetic resin composition and the shaped product according to the present invention can be used in various applications such as: materials for automobiles, hybrid cars, electric cars, vehicles, ships, airplanes, architecture, houses, and buildings, such as seats (stuffing, outer cloth, etc.), belts, ceiling cladding, convertible tops, armrests, door trims, rear package trays, carpets, mats, sun visors, wheel covers, mattress covers, airbags, insulators, straps, strap belts, wire coverings, electrical insulators, paint, coating materials, overlay materials, floor materials, corner walls, carpets, wallpapers, wall cladding, exterior cladding, interior cladding, roof materials, deck materials, wall materials, pillar materials, decking, fence materials, framework, molding, windows, door-shape materials, shingles, panel boards, terraces, balconies, acoustical insulation boards, heat-insulating boards, and window materials; civil engineering materials; and everyday commodities and sporting goods, such as clothing, curtains, bed linen, plywood, synthetic fiber boards, rugs, doormats, sheets, buckets, hoses, containers, eyeglasses, bags, cases, goggles, skis, rackets, tents, and musical instruments.

EXAMPLES

The present invention is described in further detail below according to Examples. The present invention, however, is not limited whatsoever by the following Examples. It should be noted that the formulations shown in Tables 1 to 4 are all in terms of mass.

Examples 1 to 6 and Comparative Examples 1 to 5

Flame retardant compositions of the invention were prepared according to the formulations shown in Table 1. Compound No. 1 having the following structure was used for the bicyclophosphoric ester compound represented by the general formula (1), which is component (C).

[Chem. 9]

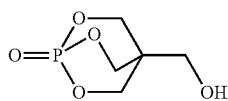

Compound No.1

Similarly, Comparative Examples of flame retardant compositions were prepared according to the formulations shown in Table 2. In the Comparative Examples, comparison was also conducted by using ammonium polyphosphate instead of component (B) of the invention.

TABLE 1

| Formulation | Example | | | | | |
|---|---|---|---|---|---|---|
| | 1 | 2 | 3 | 4 | 5 | 6 |
| Component (A): Melamine pyrophosphate[*1] | 40 | 40 | 40 | 30 | 50 | 40 |
| Component (B): Piperazine pyrophosphate[*2] | 60 | 60 | 60 | 70 | 50 | 60 |
| Component (C): Compound No. 1 | 5.0 | 3.0 | 8.0 | 5.0 | 5.0 | 5.0 |
| Component (D): Zinc oxide | | | | | | 5.0 |

[*1]The ratio between pyrophosphoric acid and melamine in melamine pyrophosphate is 1:2 in molar ratio.
[*2]The ratio between pyrophosphoric acid and piperazine in piperazine pyrophosphate is 1:1 in molar ratio.

TABLE 2

| Formulation | Comparative Example | | | | |
|---|---|---|---|---|---|
| | 1 | 2 | 3 | 4 | 5 |
| Component (A): Melamine pyrophosphate[*1] | 40 | 100 | | 40 | 40 |
| Component (B): Piperazine pyrophosphate[*2] | 60 | | | | 60 |
| Ammonium polyphosphate | | | 100 | 60 | |
| Component (C): Compound No. 1 | | 5.0 | 5.0 | 5.0 | |
| Component (D): Zinc oxide | | | | | 5.0 |

[*1]The ratio between pyrophosphoric acid and melamine in melamine pyrophosphate is 1:2 in molar ratio.
[*2]The ratio between pyrophosphoric acid and piperazine in piperazine pyrophosphate is 1:1 in molar ratio.

Examples 7 to 15 and Comparative Examples 6 to 15

A polypropylene resin composition was obtained by blending, to 60 parts by mass of polypropylene (melt flow rate: 8 g/10 min), 0.1 parts by mass of calcium stearate (lubricant), 0.1 parts by mass of tetrakis[methyl 3-(3,5-di-tert-butyl-4-hydroxyphenyl)propionate]methane (phenol-based antioxidant), 0.1 parts by mass of tris(2,4-di-tert-butylphenyl) phosphite (phosphorus-based antioxidant), and 0.3 parts by mass of glycerol monostearate (lubricant). To the obtained polypropylene resin composition, the respective flame retardant compositions obtained according to Examples 1 to 6 were added according to the formulating proportions (mass %) shown in Table 3, to obtain respective flame-retardant synthetic resin compositions according to Examples 7 to 15. Note that, as regards the flame retardant compositions used, the flame retardant composition obtained according to Example 1 is indicated as Flame retardant composition 1, the flame retardant composition obtained according to Example 2 is indicated as Flame retardant composition 2, and the same applies up to Flame retardant composition 6 obtained according to Example 6.

Likewise, the flame retardant composition obtained according to Comparative Example 1 is indicated as Comparative flame retardant composition 1, the flame retardant composition obtained according to Comparative Example 2 is indicated as Comparative flame retardant composition 2, and the same applies up to Comparative flame retardant composition 5. The respective Comparative flame retardant compositions were added according to the formulating proportions (mass %) shown in Table 4, to obtain respective Comparative flame-retardant synthetic resin compositions according to Comparative Examples 6 to 15.

Each of the obtained flame-retardant synthetic resin compositions was extruded with a biaxial extruder (TEX-28 manufactured by Japan Steel Works, Ltd.) under the conditions of 230° C. and 9 kg/hour and made into pellets, and the pellets were used for injection molding at 200° C., into a 127-mm-long, 12.7-mm-wide, 1.6-mm-thick test piece. A flame retardancy test was performed by using each test piece, in which a UL-94V test was performed according to the following test method. The results are shown in Tables 3 and 4.

Further, each of the flame-retardant synthetic resin compositions was extruded with a biaxial extruder (TEX-28 manufactured by Japan Steel Works, Ltd.) under the conditions of 230° C. and 13 kg/hour, to manufacture pellets for evaluating processability. The state of the surface of the pellets obtained for evaluating processability was visually observed, and the presence/absence of foaming was verified according to the following evaluation criteria, to evaluate processability. The results are shown in Tables 3 and 4.

{Method for UL-94V Flame Retardancy Test}

The 127-mm-long, 12.7-mm-wide, 1.6-mm-thick test piece was held vertically, a burner flame was placed in contact with the lower end of the test piece for 10 seconds and then the flame was removed, and the time it took for the fire that caught on the test piece to cease was measured. Then, at the same time as the cessation of the burning, a burner flame was placed in contact with the test piece for 10 seconds for the second time, and the time it took for the fire that caught on the test piece to cease was measured, like the first time. At the same time, evaluation was made as to whether or not flaming particles that dropped from the test piece ignite a piece of cotton located below the test piece.

From the first and second combustion times and whether or not the cotton piece ignited, each test piece was ranked according to the UL-94V standard. The combustion rank V-0 is the highest rank, and flame retardancy decreases in the order of V-1 to V-2. Note that test pieces that do not fall under any of the ranks V-0 to V-2 are indicated as NR.

{Processability Evaluation}

Good: Almost no trace of foaming was observed on the surface of the pellets, and processability was excellent.

Fair: Few traces of foaming were observed on the surface of the pellets.

Poor: Many traces of foaming were observed on the surface of the pellets, and processability was poor.

TABLE 3

| Formulation | Example | | | | | | | | |
|---|---|---|---|---|---|---|---|---|---|
| | 7 | 8 | 9 | 10 | 11 | 12 | 13 | 14 | 15 |
| Flame retardant composition 1 obtained according to Example 1 | 22% | 24% | | | | | | | |
| Flame retardant composition 2 obtained according to Example 2 | | | 24% | | | | | | |
| Flame retardant composition 3 obtained according to Example 3 | | | | 24% | | | | | |
| Flame retardant composition 4 obtained according to Example 4 | | | | | 22% | 24% | | | |
| Flame retardant composition 5 obtained according to Example 5 | | | | | | | 24% | | |
| Flame retardant composition 6 obtained according to Example 6 | | | | | | | | 22% | 24% |
| UL-94V flame retardancy test | V-0 | V-0 | V-0 | V-0 | V-0 | V-0 | V-0 | V-0 | V-0 |
| Processability evaluation | Good | Good | Good | Good | Good | Good | Good | Good | Good |

TABLE 4

| Formulation | Comparative Example | | | | | | | | | |
|---|---|---|---|---|---|---|---|---|---|---|
| | 6 | 7 | 8 | 9 | 10 | 11 | 12 | 13 | 14 | 15 |
| Comparative flame retardant | 22% | 24% | | | | | | | | |

TABLE 4-continued

| Formulation | Comparative Example | | | | | | | | | |
|---|---|---|---|---|---|---|---|---|---|---|
| | 6 | 7 | 8 | 9 | 10 | 11 | 12 | 13 | 14 | 15 |
| composition 1 obtained according to Comparative Example 1 | | | | | | | | | | |
| Comparative flame retardant composition 2 obtained according to Comparative Example 2 | | | 22% | 24% | | | | | | |
| Comparative flame retardant composition 3 obtained according to Comparative Example 3 | | | | | 22% | 24% | | | | |
| Comparative flame retardant composition 4 obtained according to Comparative Example 4 | | | | | | | 22% | 24% | | |
| Comparative flame retardant composition 5 obtained according to Comparative Example 5 | | | | | | | | | 22% | 24% |
| UL-94V flame retardancy test | V-2 | V-2 | NR | NR | NR | NR | NR | NR | V-2 | V-2 |
| Processability evaluation | Fair | Fair | Fair | Fair | Poor | Poor | Poor | Poor | Fair | Fair |

The invention claimed is:

1. A flame retardant composition comprising 20 to 50 parts by mass of component (A), 50 to 80 parts by mass of component (B), the parts by mass of component (A) plus the parts by mass of component (B) being equal to 100 parts by mass, and 3.0 to 8.0 parts by mass of component (C) wherein:
component (A) is at least one melamine salt selected from the group consisting of melamine orthophosphate, melamine pyrophosphate, and melamine polyphosphate;
component (B) is at least one piperazine salt selected from the group consisting of piperazine orthophosphate, piperazine pyrophosphate, and piperazine polyphosphate; and
component (C) is a bicyclophosphoric ester compound represented by general formula (1) below:

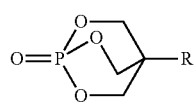

(1)

wherein R represents a $C_{1-4}$ alkyl group or a $C_{1-4}$ hydroxyalkyl group.

2. The flame retardant composition according to claim 1, further comprising 0.01 to 10 parts by mass of zinc oxide as component (D).

3. A flame-retardant synthetic resin composition made by blending said flame retardant composition according to claim 1 to a synthetic resin.

4. The flame-retardant synthetic resin composition according to claim 3, wherein the synthetic resin is a polyolefin-based resin.

5. A shaped product obtained from said flame-retardant synthetic resin composition according to claim 3.

6. A flame-retardant synthetic resin composition made by blending said flame retardant composition according to claim 2 to a synthetic resin.

7. A shaped product obtained from said flame-retardant synthetic resin composition according to claim 4.

8. A shaped product obtained from said flame-retardant synthetic resin composition according to claim 6.

* * * * *